(12) United States Patent
Arora et al.

(10) Patent No.: US 9,535,814 B2
(45) Date of Patent: Jan. 3, 2017

(54) DYNAMIC BORDER LINE TRACING FOR TRACKING MESSAGE FLOWS ACROSS DISTRIBUTED SYSTEMS

(71) Applicant: NEC Laboratories America, Inc., Princeton, NJ (US)

(72) Inventors: Nipun Arora, Plainsboro, NJ (US); Junghwan Rhee, Princeton, NJ (US); Hui Zhang, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 149 days.

(21) Appl. No.: 14/665,519

(22) Filed: Mar. 23, 2015

(65) Prior Publication Data

US 2015/0278069 A1 Oct. 1, 2015

Related U.S. Application Data

(60) Provisional application No. 61/972,539, filed on Mar. 31, 2014.

(51) Int. Cl.
*G06F 9/44* (2006.01)
*G06F 11/34* (2006.01)

(52) U.S. Cl.
CPC .................. *G06F 11/3466* (2013.01)

(58) Field of Classification Search
CPC ........................................................ G06F 9/44
USPC .................................. 717/130–133, 162–167
See application file for complete search history.

(56) References Cited

U.S. PATENT DOCUMENTS

| 8,458,263 B1 * | 6/2013 | Ruben ................... H04L 12/586 707/661 |
| 2012/0272224 A1 * | 10/2012 | Brackman ........... G06F 9/44521 717/151 |

OTHER PUBLICATIONS

Arora (iProbe: A lightweight user-level dynamic instrumentation tool), Nov. 2013.*
Tuxedo http://docs.oracle.com/cd/E15261_01/tuxedo/docs11gr1/int/intatm.html.
LD_PRELOAD http://www.linuxjournal.com/article/7795.
Galen Hunt and Doug Brubacher, Detours: Binary Interception of Win32 Functions, in Third USENIX Windows NT Symposium, USENIX, Jul. 1999.
C.-K. Luk, R. Cohn, R. Muth, H. Patil, A. Klauser, G. Lowney, S. Wallace, V. J. Reddi, and K. Hazelwood. Pin: building customized program analysis tools with dynamic instrumentation. In Proceedings of the 2005 ACM SIGPLAN conference on Programming language design and implementation, PLDI '05, pp. 190-200, New York, NY, USA, 2005. ACM.
(Continued)

*Primary Examiner* — Chat Do
*Assistant Examiner* — Jae Jeon
(74) *Attorney, Agent, or Firm* — Joseph Kolodka

(57) ABSTRACT

The present invention enables capturing API level calls using a combination of dynamic instrumentation and library overriding. The invention allows event level tracing of API function calls and returns, and is able to generate an execution trace. The instrumentation is lightweight and relies on dynamic library/shared library linking mechanisms in most operating systems. Hence we need no source code modification or binary injection. The tool can be used to capture parameter values, and return values, which can be used to correlate traces across API function calls to generate transaction flow logic.

12 Claims, 3 Drawing Sheets

(56) References Cited

OTHER PUBLICATIONS

B. M. Cantrill, M. W. Shapiro, and A. H. Leventhal. Dynamic instrumentation of production systems. In Proceedings of the annual conference on USENIX Annual Technical Conference, ATEC '04, pp. 2-2, Berkeley, CA, USA, 2004. USENIX Association.
Eric Koskinen and John Jannotti. 2008. BorderPatrol: isolating events for black-box tracing. SIGOPS Oper. Syst. Rev. 42, 4 (Apr. 2008), 191-203. DOI=10.1145/1357010.1352613 http://doi.acm.org/10.1145/1357010.1352613.
Bryan Buck and Jeffrey K. Hollingsworth. 2000. An API for Runtime Code Patching. Int. J. High Perform. Comput. Appl. 14, 4 (Nov. 2000), 317-329. DOI=10.1177/109434200001400404 http://dx.doi.org/10.1177/109434200001400404.
SystemTap http://sourceware.org/systemtap/.
Arora, N.; Hui Zhang; Junghwan Rhee; Yoshihira, K.; Guofei Jiang, "iProbe: A lightweight user-level dynamic instrumentation tool," Automated Software Engineering (ASE), 2013 IEEE/ACM 28th International Conference on , vol., No., pp. 742,745, Nov. 11-15, 2013.

* cited by examiner

DYNAMIC BORDER LINE TRACING FOR TRACKING MESSAGE FLOWS ACROSS DISTRIBUTED SYSTEMS

RELATED APPLICATION INFORMATION

This application claims priority to provisional application No. 61/972,539, filed Mar. 31, 2014, entitled "Method and Apparatus to do Dynamic Border Line Tracing for Tracking Message Flows Across Distributed Systems", the contents thereof are incorporated herein by reference

BACKGROUND OF THE INVENTION

The present invention relates generally to distributed systems, and more particularly, to dynamic borderline tracing for tracking message flows across distributed systems.

The following references [1]-[9] are noted herein:
[1]. Tuxedo http://docs.oracle.com/cd/E15261_01/tuxedo/docs11gr1/int/intatm.html
[2]. LD_PRELOAD http://www.linuxjournal.com/article/7795.
[3]. Galen Hunt and Doug Brubacher, Detours: Binary Interception of Win32 Functions, in Third USENIX Windows NT Symposium, USENIX, July 1999.
[4]. C.-K. Luk, R. Cohn, R. Muth, H. Patil, A. Klauser, G. Lowney, S. Wallace, V. J. Reddi, and K. Hazelwood. Pin: building customized program analysis tools with dynamic instrumentation. In Proceedings of the 2005 ACM SIGPLAN conference on Programming language design and implementation, PLDI '05, pages 190-200, New York, N.Y., USA, 2005. ACM.
[5]. B. M. Cantrill, M. W. Shapiro, and A. H. Leventhal. Dynamic instrumentation of production systems. In *Proceedings of the annual conference on USENIX Annual Technical Conference*, ATEC '04, pages 2-2, Berkeley, Calif., USA, 2004. USENIX Association.
[6]. Eric Koskinen and John Jannotti. 2008. BorderPatrol: isolating events for black-box tracing. *SIGOPS Oper. Syst. Rev.* 42, 4 (April 2008), 191-203. DOI=10.1145/1357010.1352613 http://doi.acm.org/10.1145/1357010.1352613.
[7]. Bryan Buck and Jeffrey K. Hollingsworth. 2000. An API for Runtime Code Patching. *Int. J. High Perform. Comput. Appl.* 14, 4 (November 2000), 317-329. DOI=10.1177/109434200001400404 http://dx.doi.org/10.1177/109434200001400404
[8]. SystemTap http://sourceware.org/systemtap/.
[9]. Arora, N.; Hui Zhang; Junghwan Rhee; Yoshihira, K.; Guofei Jiang, "iProbe: A lightweight user-level dynamic instrumentation tool," *Automated Software Engineering (ASE), 2013 IEEE/ACM 28th International Conference on*, vol., no., pp. 742,745, 11-15 Nov. 2013.

Obtaining precise request traces in distributed systems can be a difficult task. Traditional log data provided by applications, using system call logs is usually insufficient to generate end-to end transaction flow. Information in trace logs from applications either contains user-request data or occasionally debug data, which is too sparse to generate the flow. On the other hand, system calls are too low-layered and are often not useful to the developers in debugging any problems (since user-space information is usually more valuable).

In distributed applications the request spans across several modules and the execution flow is multiplexed across modules in nodes across the distributed system. These modules are usually written by different teams and provide a clear layer of communication (API Function) between them. Capturing these API functions provides optimal granularity to show inter-module communication while not incurring a high overhead. In this invention we aim to utilize this layer of communication to generate transaction flow across distributed systems. Additionally, we present an analysis of the message logs generate from our approach on message queuing systems (e.g. Tuxedo[1]), to show end-to-end transaction flow tracking.

Dynamic instrumentation is a well studied field and there are several tools, [4], [5], that provide such instrumentation capability. These tools usually have high overhead and may or may not require access to the source code. Since we need a black-box mechanism which is lightweight, we use iProbe here as the basis of our dynamic instrumentation as it allows us to turn on and off instrumentation inside without any modification of the source code.

The closest work towards dynamic border-line tracing is BorderPatrol [6]. See Eric Koskinen and John Jannotti. 2008. BorderPatrol: isolating events for black-box tracing. *SIGOPS Oper. Syst. Rev.* 42, 4 (April 2008), 191203.DOI=10.1145/1357010.1352613, http://doi.acm.org/10.1145/1357010.1352613.

The BorderPatrol explores tracing API libraries. These API calls can then be used as breadcrumbs to generate the transaction flow. However, unlike our approach, BorderPatrol focuses on system library API calls, also it does not provide any dynamic instrumentation facility. Other dynamic instrumentation tools include PIN[4], dyninst[7], SystemTap[8], DTrace[5] etc. However, these tools have an extremely high overhead or are unable to capture user-space functions.

Accordingly, there is a need for a dynamic borderline tracing for tracking message flows across distributed systems.

BRIEF SUMMARY OF THE INVENTION

The invention is directed to a controller for a distributed system that includes tracing application flows at an application program interface API level in a distributed system. The tracing includes generating an overriding library with placeholders for hot-patching and setting up trampolines and hot-patch no-operations NOPs, at any step in execution of an application, patching the application in with an instrumentation being triggered on, capturing, with an override instrumentation function, relevant call parameters and return values that are stored to a common log file along with all process names, finishing hot-patching and pushing all logs for analysis once an instrumentation period is finished, and analyzing transaction logs from various API boundaries and reconstructing execution flow.

In a similar aspect of the invention, there is provided non-transitory storage medium with instructions to enable a computer implemented method for dynamic instrumentation in a distributed system that includes tracing application flows at an application program interface API level in a distributed system. The tracing includes generating an overriding library with placeholders for hot-patching and setting up trampolines and hot-patch no-operations NOPs, at any step in execution of an application, patching the application in with an instrumentation being triggered on, capturing, with an override instrumentation function, relevant call parameters and return values that are stored to a common log file along with all process names, finishing hot-patching and pushing all logs for analysis once an instrumentation period is finished, and analyzing transaction logs from various API boundaries and reconstructing execution flow.

In yet another similar aspect of the invention, method implemented by a computer for enabling dynamic instrumentation in a distributed system includes tracing application flows at an application program interface API level in a distributed system. The tracing includes generating an overriding library with placeholders for hot-patching and setting up trampolines and hot-patch no-operations NOPs, at any step in execution of an application, patching the application in with an instrumentation being triggered on, capturing, with an override instrumentation function, relevant call parameters and return values that are stored to a common log file along with all process names, finishing hot-patching and pushing all logs for analysis once an instrumentation period is finished, and analyzing transaction logs from various API boundaries and reconstructing execution flow.

These and other advantages of the invention will be apparent to those of ordinary skill in the art by reference to the following detailed description and the accompanying drawings.

DETAILED DESCRIPTION

The invention provides a novel monitoring solution called dynamic border-line tracing, which uses black-box approach to track transaction flow at the API level (borders of application), to infer and track transaction flow. This solution has been integrated with a dynamic instrumentation tool, iProbe [9] to allow for dynamically turning the tracing on/off.

The inventive solution two aspects 1) dynamic border line user space tracing and 2) analysis. With dynamic border line user space tracking the solution uses library interposition technology (e.g. LD_PRELOAD) to override targeted API functions of the middleware with a wrapper of the same signature as the function. The wrapper allows us to instrument the function and capture the output at execution time. Additionally, we can capture this dynamically by modifying a previous technology of inventors, called iProbe [9]. With the analysis, the solution applies data analysis on our logs to create end-to-end traces of message queuing systems. Our tool captures message contents and return values passed through various API's, and then uniquely links them to the user-level transactions.

Figure 1:
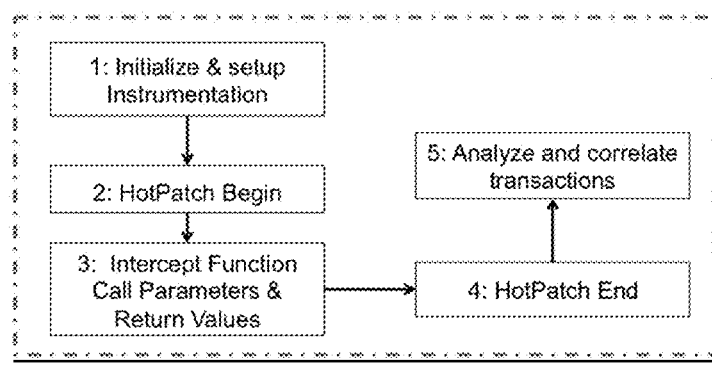
FIG. 1 shows components of dynamic borderline tracing, in accordance with the invention.

The process for applying dynamic borderline tracing on an application can be broadly divided into 5 steps, shown in FIG. 1:
1. Initialization & Setup: This step initialized and sets up all our instrumentation. The developer needs to generate an overriding library, and setup the trampoline and hot-patch NOP's.
2. HotPatch Begin: Once the application is executing at any step in the execution the application can be patched in with the instrumentation being triggered on.
3. Intercept/Override Function Call Parameters & Return Values: The override instrumentation functions capture relevant call parameters and return values and store them to a common log file, along with all the process names.
4. HotPatch End: Once instrumentation period is finished, the invention can finish hotpatching and push all the logs for analysis.
5. Analyze and correlate transactions: This step analyzes the transaction logs from various API boundaries, and reconstruct the execution flow.

Figure 2:
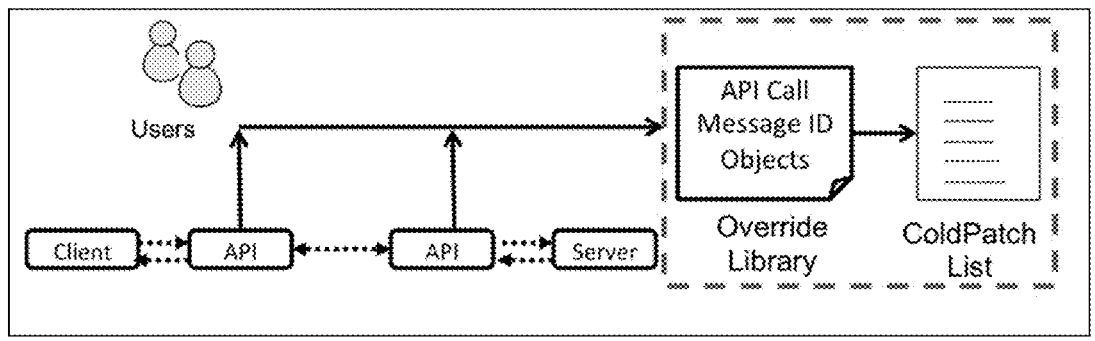
FIG. 2 diagrams users need to generate overriding library by looking at API functions defined in the target application.

Step 1, Initialization and Setup:

The first step for using our approach is to generate an overriding library with placeholders for hotpatching. See FIG. 2. This allows for seamless instrumentation when the application is executing. Overriding functions are wrapper functions with the exact same signature as the target function, these functions in turn call original functions and in the process are able to capture the arguments being passed to the real function and the return value, without modifying the actual logic. The key trick in overriding target functions is the lazy linking mechanism of shared libraries of dynamically linked libraries.

As an example in Linux the command LD_PRELOAD instructs the dynamic linker to preload functions defined in the LD_PRELOAD path to the symbol library of the target executable before any other symbols are linked. This ensures that if any symbol with the signature present in the library is called the function present in the LD_PRELOAD path will take priority over any other symbols with the same signature. Using this technique a trampoline function (intermediary function which acts as a relay point to call the actual function), can be easily constructed. This is done by calling the next function with the same symbol name from within the body of the trampoline function.

Figure 3:
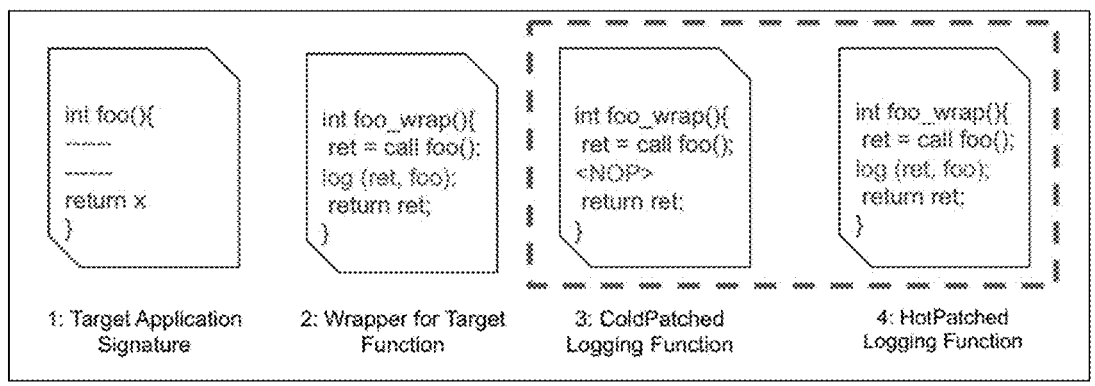
FIG. 3 is a state diagram for overriding wrapper functions and hot patching, in accordance with the invention.

State 1 and 2 in FIG. 3 show how a trampoline function can be created for a target function foo, which returns an integral value. Here the trampoline function foo_wrap has the same signature and the same name as the symbol foo, and is put in the overriding library. From the overriding library we call the next symbol with the same name as foo. At the same time we use a logging function to log the return value and arguments/parameters passed to foo.

Again referring to FIG. 3, State 3 shows a coldpatched binary (ready for "hotpatching"), here we modify the call to the logging function in the trampoline with a <NOP> instruction (in most common x86 32 bit and 64 bit architectures this is instruction 90 with a length of 2). At the same time we capture the instruction address/offsets of log functions in the trampolines and store it in a "ColdPatch List".

Step 2 HotPatch Begin, Step 3 Intercept Function Call Parameters & Return Values & Step 4 HotPatch End:

At the run-time stage we use these offsets to patch back the call to the logging function, thereby enabling the instrumentation. Once the instrumentation period is over, the logging function can be patched back with the <NOP> instruction.

The majority of the overhead in trampoline-based instrumentation comes from actually logging, and performing I/O operation. Even an optimized mechanism to amortize the cost of logging still does not remove the overhead completely. With our technique the logging aspect of instrumentation can be dynamically enabled, at the same time there is no modification required of either the source code, or even the binary.

Figure 4:
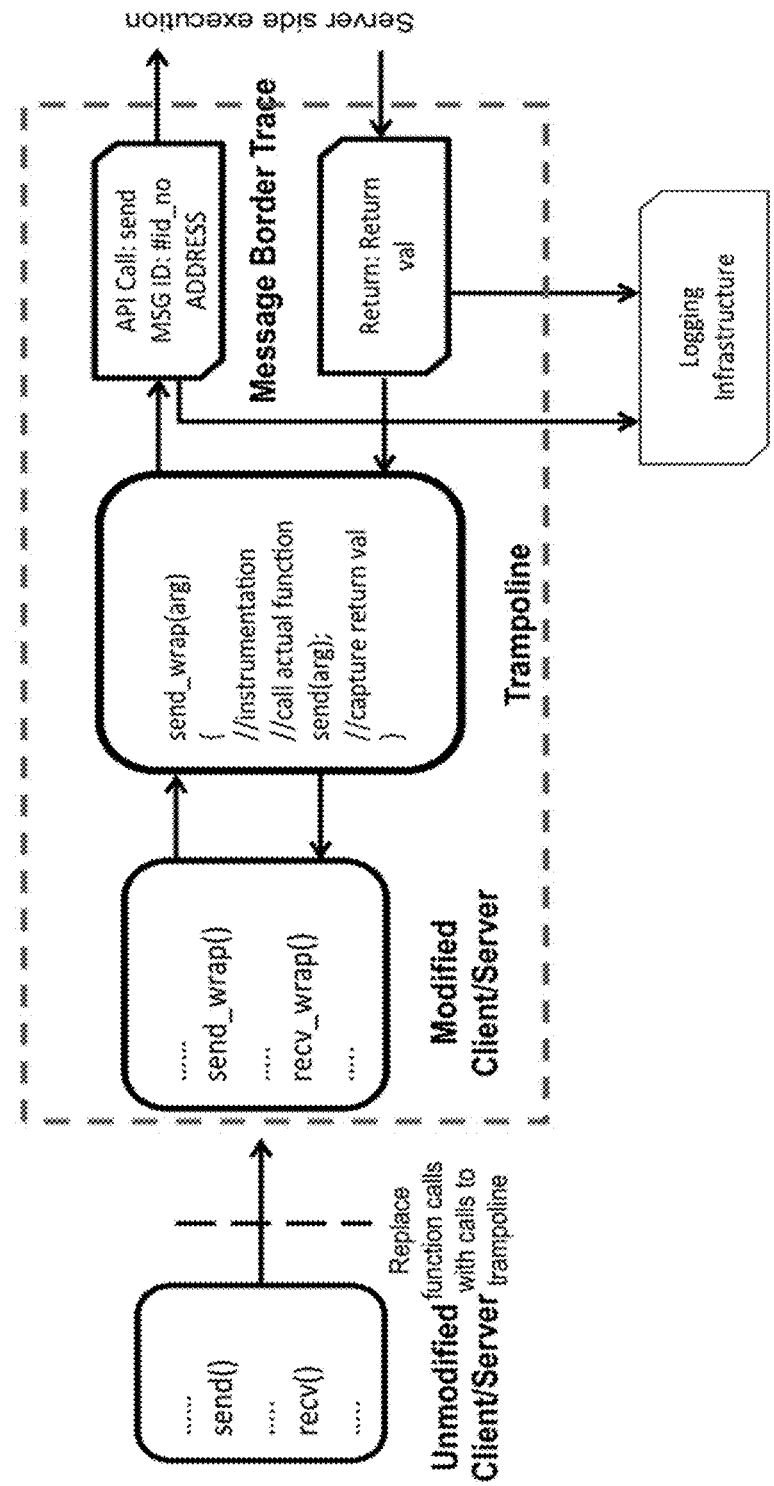
FIG. 4 is a diagram capturing arguments and return values followed by analysis, in accordance with the invention.

Step 5 Analyze and Correlate Transactions:

FIG. 4 shows how dynamic borderline tracing can be used to capture and generate message identifiers that can uniquely be linked to the transaction. The trampoline function generates a message ID by hashing the message contents being sent across to other services. In most message based systems, the same content is routed to the end-service process, this enables us to uniquely identify the message using the message ID, a similar approach can be applied to return values in order to track the whole transaction completely across the system.

An alternate mechanism is to capture message ID used internally by the target middleware and use it as the identifier. However this requires a bit of domain knowledge of the system, and identifier may not be easy to locate.

The invention may be implemented in hardware, firmware or software, or a combination of the three. Preferably the invention is implemented in a computer program executed on a programmable computer or a controller having a processor, a data storage system, volatile and non-volatile memory and/or storage elements, at least one input device and at least one output device. More details are discussed in U.S. Pat. No. 8,380,557, the content of which is incorporated by reference.

Figure 5:
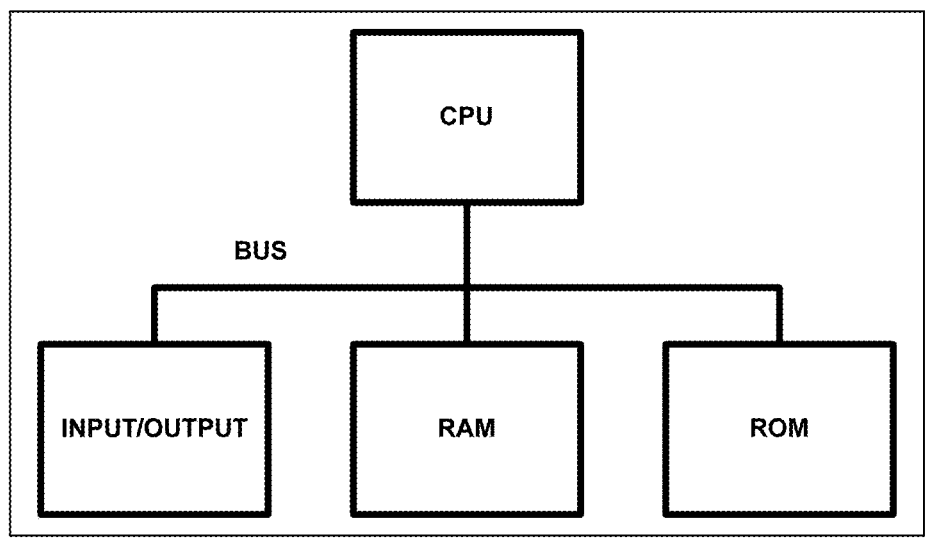
FIG. 5 is a diagram of an exemplary computer or controller for carrying out the inventive dynamic borderline tracing for message flow tracking across distributed systems.

By way of example, a block diagram of a computer or controller to support the invention is discussed next in FIG. 5. The computer or controller preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the following are some of the main advantageous features of the inventive dynamic border-line tracing:

Low overhead monitoring.
Uses Library Interposition Approach such as LD_PRELOAD[2], or DETOURS[3].
Blackbox monitoring—we only need to know the API signatures, and do not need to modify any source code.
No effect when instrumentation is not turned on, or on segments which are not instrumented (Zero Probe Effect.
Platform independent with easy deployment (no changes to kernel/special compiler/VM or run-time interface etc.)
User defined scope of instrumentation.
Light-weight and transparent recording mechanism.
Applied at run-time—Hence, No application restart required.
No modification of source code, or binary injection required.

It is believed that dynamic borderline tracing is the first tool of its kind, and provides valuable insight in tracing distributed systems. In particular the novelty of our approach lies in combining library interposition technology and hot-tracing technology in a novel way to provide a low overhead technique to instrument API function at application borders.

The advantage of overriding dynamic library functions is that it can be applied without any modification of the source code. However, the disadvantage is that once functions are overridden it is not possible to turn instrumentation off. Dynamic instrumentation is a highly desirable feature for most production level software, since they cannot tolerate overheads caused due to instrumentation. In the technique we present here, we combine the advantages of library interposition, and iProbe's novel lightweight dynamic instrumentation. While at the same time we avoid the disadvantages of both.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A controller for a distributed system comprising: a processor and a memory;
   tracing application flows at an application program interface (API) level in a distributed system, the tracing, wherein the tracing includes capturing and generating message identifiers that can uniquely be linked to a transaction, a trampoline function from trampolines generating a message identification by hashing message contents being sent across to other services, the tracing enabling uniquely identifying a message using the message identification by the same content being routed to an end-service process with message based systems, comprising:
   generating an overriding library with placeholders for hot-patching and setting up the trampolines and hot-patch no-operations (NOPs), wherein the overriding library includes overriding functions that are wrapper functions with an exact same signature as a target function, the wrapper functions in turn calling original functions and in the process being able to capture arguments being passed to a real function and a return value, without modifying actual logic, a key aspect in overriding target functions includes a lazy linking of shared libraries of dynamically linked libraries;

at any step in execution of an application, patching the application in with an instrumentation being triggered on;

capturing, with an override instrumentation function, relevant call parameters and return values that are stored to a common log file along with all process names;

finishing hot-patching and pushing all logs for analysis once an instrumentation period is finished; and analyzing transaction logs from various API boundaries and reconstructing execution flow.

2. The controller of claim 1, wherein the trampolines include trampoline functions that can be created for a target function which returns an integral value, the trampoline function has the same signature and the same name as a symbol of the target function and is put in the overriding library, from the overriding library the tracing application calls the next symbol with the same name as the target function and at the same time there is use of a logging function to log the return value and arguments/parameters passed to the target function.

3. The controller of claim 1, wherein the generating includes a cold patched list that includes a cold patched binary which is modified to call to a logging function in with the trampoline function with an NOP instruction and at the same time there is a capture of instruction addresses/offsets of log functions in the trampolines.

4. The controller of claim 1, wherein a majority of overhead in trampoline based instrumentation comes from actually logging, and performing I/O operation with even an optimized mechanism to amortize a cost of logging still not removing the overhead completely, the tracing step including dynamically enabling logging of instrumentation while at the same time there being no modification required of either source code.

5. A non-transitory storage medium with instructions to enable a computer implemented method for dynamic instrumentation in a distributed system that comprises:

tracing application flows at an application program interface (API) level in a distributed system, wherein the tracing includes capturing and generating message identifiers that can uniquely be linked to a transaction, a trampoline function from trampolines generating a message identification by hashing message contents being sent across to other services, the tracing enabling uniquely identifying a message using the message identification by the same content being routed to an end-service process with message based systems, the tracing comprising:

generating an overriding library with placeholders for hot-patching and setting up the trampolines and hot-patch no-operations (NOPs), wherein the overriding library includes overriding functions that are wrapper functions with an exact same signature as a target function, the wrapper functions in turn calling original functions and in the process being able to capture arguments being passed to a real function and a return value, without modifying actual logic, a key aspect in overriding target functions includes a lazy linking of shared libraries of dynamically linked libraries;

at any step in execution of an application, patching the application in with an instrumentation being triggered on;

capturing, with an override instrumentation function, relevant call parameters and return values that are stored to a common log file along with all process names;

finishing hot-patching and pushing all logs for analysis once an instrumentation period is finished; and analyzing transaction logs from various API boundaries and reconstructing execution flow.

6. The storage medium of claim 5, wherein the trampolines include trampoline functions that can be created for a target function which returns an integral value, the trampoline function has the same signature and the same name as a symbol of the target function and is put in the overriding library, from the overriding library the tracing application calls the next symbol with the same name as the target function and at the same time there is use of a logging function to log the return value and arguments/parameters passed to the target function.

7. The storage medium of claim 5, wherein the generating includes a cold patched list that includes a cold patched binary which is modified to call to a logging function in with the trampoline function with an NOP instruction and at the same time there is a capture of instruction addresses/offsets of log functions in the trampolines.

8. The storage medium of claim 5, wherein a majority of overhead in trampoline based instrumentation comes from actually logging, and performing I/O operation with even an optimized mechanism to amortize a cost of logging still not removing the overhead completely, the tracing step including dynamically enabling logging of instrumentation while at the same time there being no modification required of either source code.

9. A computer implemented method for enabling dynamic instrumentation in a distributed system comprising:

tracing application flows at an application program interface (API) level in a distributed system, wherein the tracing includes capturing and generating message identifiers that can uniquely be linked to a transaction, a trampoline function from trampolines generating a message identification by hashing message contents being sent across to other services, the tracing enabling uniquely identifying a message using the message identification by the same content being routed to an end-service process with message based systems, the tracing comprising:

generating an overriding library with placeholders for hot-patching and setting up the trampolines and hot-patch no-operations (NOPs), wherein the overriding library includes overriding functions that are wrapper functions with an exact same signature as a target function, the wrapper functions in turn calling original functions and in the process being able to capture arguments being passed to a real function and a return value, without modifying actual logic, a key aspect in overriding target functions includes a lazy linking of shared libraries of dynamically linked libraries;

at any step in execution of an application, patching the application in with an instrumentation being triggered on;

capturing, with an override instrumentation function, relevant call parameters and return values that are stored to a common log file along with all process names;

finishing hot-patching and pushing all logs for analysis once an instrumentation period is finished; and analyzing transaction logs from various API boundaries and reconstructing execution flow.

10. The method of claim 9, wherein the trampolines include trampoline functions that can be created for a target function which returns an integral value, the trampoline function has the same signature and the same name as a symbol of the target function and is put in the overriding library, from the overriding library the tracing application calls the next symbol with the same name as the target function and at the same time there is use of a logging function to log the return value and arguments/parameters passed to the target function.

11. The method of claim 9, wherein the generating includes a cold patched list that includes a cold patched binary which is modified to call to a logging function in with the trampoline function with an NOP instruction and at the same time there is a capture of instruction addresses/offsets of log functions in the trampolines.

12. The method of claim 9, wherein a majority of overhead in trampoline based instrumentation comes from actually logging, and performing I/O operation with even an optimized mechanism to amortize a cost of logging still not removing the overhead completely, the tracing step including dynamically enabling logging of instrumentation while at the same time there being no modification required of either source code.

* * * * *